United States Patent
Yamashita et al.

(10) Patent No.: US 10,148,141 B2
(45) Date of Patent: Dec. 4, 2018

(54) MOTOR ROTOR STRUCTURE FOR ELECTRIC TURBO CHARGER AND METHOD OF ASSEMBLING SAME

(75) Inventors: Yukio Yamashita, Tokyo (JP); Noriyuki Hayashi, Tokyo (JP); Seiichi Ibaraki, Tokyo (JP); Katsuyuki Osako, Kitakyushu (JP); Motoki Ebisu, Tokyo (JP); Byeongil An, Tokyo (JP); Hiroshi Suzuki, Tokyo (JP); Hideaki Arita, Tokyo (JP); Takashi Goto, Tokyo (JP); Toshihiko Miyake, Tokyo (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 1220 days.

(21) Appl. No.: 14/122,601

(22) PCT Filed: Jun. 4, 2012

(86) PCT No.: PCT/JP2012/064397
§ 371 (c)(1),
(2), (4) Date: Jan. 13, 2014

(87) PCT Pub. No.: WO2012/169464
PCT Pub. Date: Dec. 13, 2012

(65) Prior Publication Data
US 2014/0125208 A1    May 8, 2014

(30) Foreign Application Priority Data
Jun. 8, 2011   (JP) .................. 2011-127914

(51) Int. Cl.
*H02K 1/22*  (2006.01)
*F02C 6/12*  (2006.01)
(Continued)

(52) U.S. Cl.
CPC .............. *H02K 1/22* (2013.01); *F02C 6/12* (2013.01); *H02K 1/28* (2013.01); *H02K 1/30* (2013.01);
(Continued)

(58) Field of Classification Search
CPC .... F02C 6/12; F05D 2220/76; F05D 2230/60; H02K 1/22; H02K 1/28; H02K 1/30;
(Continued)

(56) References Cited

U.S. PATENT DOCUMENTS 5,142,175 A * 8/1992 Watanabe ........... F16C 32/0444
                                        310/112
5,557,157 A * 9/1996 Shirasaki ............... H02N 2/163
                                        310/323.11

(Continued)

FOREIGN PATENT DOCUMENTS

CN    201635829 U    11/2010
DE    19518317 A1    11/1996

(Continued)

OTHER PUBLICATIONS

English Translation of JP 05-019529, IDS.*

(Continued)

*Primary Examiner* — Michael Andrews
*Assistant Examiner* — Rashad Johnson
(74) *Attorney, Agent, or Firm* — Birch, Stewart, Kolasch & Birch, LLP

(57) ABSTRACT

A motor rotor structure for an electric turbo charger is manufactured at low cost with good quality by fixedly fitting, over a shaft, a rotor core having electromagnetic steel sheets pre-formed as an integrated stack. The rotor structure includes a rotor core which is rotated by a magnetic field formed by a stator in a housing; a shaft configured to rotate a compressor impeller and the rotor core together; and a (Continued)

bearing supporting the shaft. The rotor includes the rotor core including the electromagnetic steel sheets; a stopper portion formed at an intermediate portion of the shaft to restrict axial movement of the rotor core; and a pressing unit which presses the rotor core fitted over the shaft against the stopper portion. The pressing unit prevents a circumferential phase shift between the shaft and the rotor core by a pressing force thereof.

10 Claims, 11 Drawing Sheets

(51) Int. Cl.
   *H02K 7/08* (2006.01)
   *H02K 15/02* (2006.01)
   *H02K 1/28* (2006.01)
   *H02K 1/30* (2006.01)
   *H02K 11/21* (2016.01)

(52) U.S. Cl.
   CPC ............ *H02K 7/08* (2013.01); *H02K 11/21* (2016.01); *H02K 15/02* (2013.01); *F05D 2220/76* (2013.01); *F05D 2230/60* (2013.01); *Y10T 29/49012* (2015.01)

(58) Field of Classification Search
   CPC . H02K 6/12; H02K 7/08; H02K 11/21; H02K 15/02; Y10T 29/49012
   USPC .................................................. 310/68 B, 60
   See application file for complete search history.

(56) References Cited

U.S. PATENT DOCUMENTS

| | | | | |
|---|---|---|---|---|
| 6,111,333 | A * | 8/2000 | Takahashi | F16C 32/0489 310/68 B |
| 7,737,592 | B2 * | 6/2010 | Makino | H02K 1/276 310/156.09 |
| 8,198,770 | B2 * | 6/2012 | Hassett | F16C 37/00 310/58 |
| 2004/0216458 | A1 | 11/2004 | Spooner | |
| 2006/0043811 | A1 * | 3/2006 | Ong | H02K 1/278 310/156.08 |
| 2007/0247012 | A1 * | 10/2007 | Shin | H02K 1/276 310/156.06 |
| 2009/0056103 | A1 * | 3/2009 | Fukumaru | B21K 25/00 29/596 |
| 2010/0109491 | A1 * | 5/2010 | Miyazaki | G01B 7/30 310/68 B |
| 2010/0247342 | A1 * | 9/2010 | Shimizu | F01D 15/10 417/410.1 |
| 2011/0116948 | A1 * | 5/2011 | Yi | H02K 1/148 417/410.1 |
| 2011/0241473 | A1 * | 10/2011 | Hippen | H02K 17/165 310/211 |
| 2012/0014819 | A1 * | 1/2012 | Ishiguro | H02K 5/128 417/410.1 |
| 2012/0139382 | A1 * | 6/2012 | Yamagishi | H02K 1/28 310/156.61 |
| 2012/0156066 | A1 * | 6/2012 | Clements | F04D 1/003 417/410.1 |
| 2014/0147306 | A1 * | 5/2014 | Yamashita | F02B 37/10 417/410.1 |
| 2015/0337850 | A1 * | 11/2015 | An | F02B 39/00 60/605.3 |

FOREIGN PATENT DOCUMENTS

| | | | |
|---|---|---|---|
| FR | 2844877 | A1 | 3/2004 |
| JP | 1-92530 | A | 4/1989 |
| JP | 4-84726 | U | 7/1992 |
| JP | 5-19529 | U | 3/1993 |
| JP | 6-87632 | U | 12/1994 |
| JP | 2000-145468 | A | 5/2000 |
| JP | 2003-49662 | A | 2/2003 |
| JP | 2003-322026 | A | 11/2003 |
| JP | 2005-330816 | A | 12/2005 |
| JP | 2007-282336 | A | 10/2007 |
| JP | 2007-321674 | A | 12/2007 |
| JP | 2007-336737 | A | 12/2007 |
| JP | 2011122538 | A * | 6/2011 |
| JP | 2012-102700 | A | 5/2012 |
| WO | WO 2010/081123 | A1 | 7/2010 |

OTHER PUBLICATIONS

Ueda et al., English Translation of 2011-122538, IDS.*
Notice of Allowance effective Jan. 27, 2016 issued in the corresponding Chinese Application No. 201280025103.2 with English Translation.
Extended European Search Report issued in the corresponding European Patent Application No. 12796169.6, dated Jun. 8, 2015.
Office Action issued in corresponding Chinese Application No. 201280025103.2 dated May 20, 2015, along with English Translations.
Interantional Search Report dated Jun. 4, 2012 for related Application PCT/JP2012/064397.
International Preliminary Report on Patentability dated Dec. 27, 2013 for PCT/JP2012/064397 with an English Translation.
Notice of Allowance for related Application No. JP2011-127914 dated Jul. 14, 2014.
Office Action dated May 10, 2017 issued in the corresponding EP Application No. 12796169.6.
Extended European Search Report effective Jan. 5, 2018 issued to the corresponding European Application No. 17190085.5.
Extended European Search Report effective Jan. 5, 2018 issued to the corresponding European Application No. 17190092.1.

* cited by examiner

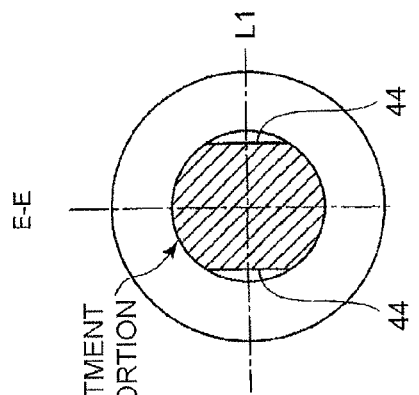
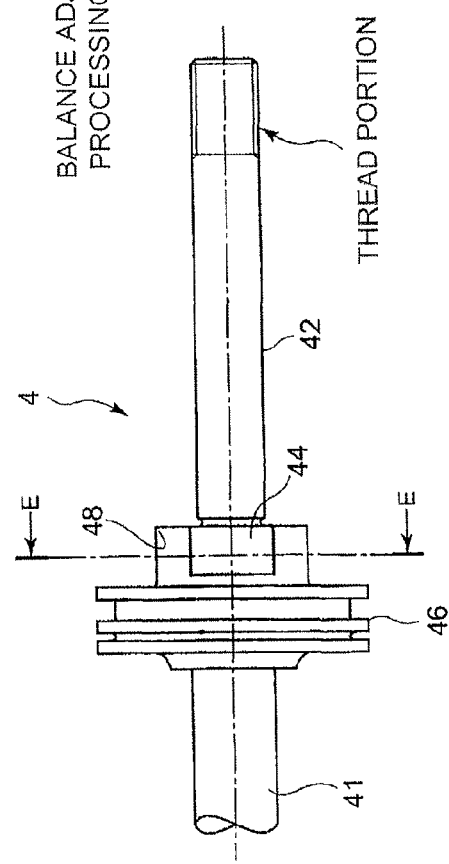

MOTOR ROTOR STRUCTURE FOR ELECTRIC TURBO CHARGER AND METHOD OF ASSEMBLING SAME

TECHNICAL FIELD

The present invention relates to a motor rotor structure for an electric turbo charger configured to turbocharge intake air into an internal combustion engine, as well as a method of assembling the same.

BACKGROUND ART

Wide use has been made of an electric turbo charger which is incorporated in an inlet system of an internal combustion engine and configured to compress and turbocharge intake air from an air cleaner in order to enhance the output power of the internal combustion engine.

An electric turbo charger is used which ensures improved acceleration responsiveness by incorporating an electric motor in a rotating shaft as a driving source of the electric turbo charger, thereby controlling revolution of a compressor impeller.

FIG. 10 is a schematic view illustrating the structure of an engine 01 incorporating a conventional electric turbo charger 03. Though the electric turbo charger shown does not have any turbine, an electric supercharger having a turbine exerts the same effect.

The electric turbo charger 03 is disposed upstream of an inlet manifold 012 of the engine 01. The electric turbo charger 03 has an electric motor 04 and a compressor impeller 032 which is disposed in an inlet path and coupled to a rotating shaft 041 of the electric motor 04.

Intake air from a non-illustrated air cleaner is compressed and charged into the engine 01 through the inlet manifold 012 by the compressor impeller 032 driven by the electric motor 04.

The rotating shaft 041 of the electric motor 04 is rotatably supported by a pair of bearing support portions (not shown) placed in a housing 031 via bearings 042. A motor rotor 043 configured to rotate the compressor impeller 032 is disposed on an intermediate portion of the rotating shaft 041 coupled to the bearings 042 and the compressor impeller 032.

A stator 044 for rotating the motor rotor 043 by generating a magnetic field is placed in the housing 031 at a position opposed to the motor rotor 043.

Reference numeral 06 designates an engine control unit (ECU) which controls operation of the engine 01 while controlling operation of the electric turbo charger 03 by controlling the amount of current to pass through the stator 044 in accordance with operating conditions of the engine 01 by means of a power transducer 08. Reference numeral 07 designates a battery which is a power source for the power transducer 08.

FIG. 11 is a schematic view illustrating the motor rotor 043 of the electric motor 04 according to Japanese Patent Application Laid-open No. 2000-145468 (Patent Document 1) as a representative example of a conventional technique. The motor rotor 043 according to Patent Document 1 is provided with a pair of bearings 042 on the rotating shaft 041 having one end fitted with a turbine blade 05 (equivalent to the compressor impeller 032 shown in FIG. 7), the bearings 042 being spaced apart from each other on the rear side of the turbine blade 05.

A rotor 046 is disposed between the pair of bearings 042. In this case, it is essential that a permanent magnet be used in the rotor 046 and that a sleeve 047 be fitted over the outer periphery of the permanent magnet in order to prevent the permanent magnet from scattering to the periphery.

The stator 044 for rotating the rotating shaft 041 in cooperation with the permanent magnet of the motor rotor 043 is disposed in the housing 031 so as to circumscribe the outer periphery of the motor rotor 043.

Patent Document 1: Japanese Patent Application Laid-open No. 2000-145468

However, the temperature of the place where the motor is disposed becomes elevated due to self-heating of the motor and heat generated from the engine and, hence, the motor using the permanent magnet is demagnetized with rising temperature, thus exhibiting substantial degradation in performance.

As a remedy, there is a magnetic inductor type motor as one of motors of the type which does not use any permanent magnet in the motor rotor.

The magnetic inductor type motor is configured to drive a rotor core which is a rotor comprising stacked electromagnetic steel sheets or a combination of stacked electromagnetic steel sheets and an iron material by a stator circumscribing the rotor core. A field flux is generated by a field coil provided along the stator axis or a field magnet generating a magnetic flux along the stator axis.

However, the supercharger has a structure in which the magnetic inductor type motor and the compressor impeller are mounted on a shaft which is rotatably supported in a housing by means of bearings.

The rotor core mounted on the rotating shaft of the magnetic inductor type motor comprises thin electromagnetic steel sheets which are stacked in the thickness direction of the steel sheets and are securely fixed to the rotating shaft.

Thorough control of maintenance of the assembly quality is needed to prevent the thin electromagnetic steel sheets from exfoliating and deforming during the operation of fixing the stacked electromagnetic steel sheets to the shaft of the turbine rotor, thus resulting in a problematic increase in cost with increasing man-hour.

There are a case where the bearings are positioned at opposite outer ends of the rotor core and a case where the bearings are positioned only between the compressor impeller and the rotor core.

In such cases, an assembly operation includes press-fitting or shrink-fitting (or cooling-fitting) the compressor impeller and the rotor core over the shaft after balance adjustment has been made to each of the compressor impeller and the rotor core as a single item. For this reason, when the fitting of the rotor core and compressor impeller ends in failure, the compressor impeller, the shaft, the bearings which have been already mounted, and the like cannot be used any longer.

Further, since the rotor core mounted on the rotating shaft of the magnetic inductor type motor comprises the thin electromagnetic steel sheets in a state of being stacked in the direction of the thickness thereof, variations in the interlayer gaps between the stacked electromagnetic steel sheets are likely to give rise to a difference in magnetic property between individual rotor cores, thus resulting in a problem that a stable control of quality maintenance becomes difficult in terms of motor performance.

DISCLOSURE OF THE INVENTION

The present invention has been made in order to solve such problems. An object of the present invention is to provide a motor rotor structure for an electric turbo charger and a method of assembling the same which are capable of stabilizing the performance of the motor rotor for an electric turbo charger and making ensured assembly quality and low-cost manufacturing compatible with each other by securely fitting a previously integrated stack of electromagnetic steel sheets over the shaft so as not to rotate the stack relative to the shaft and then pressing the rotor core in the thrust direction via an intervening sensor target plate having a larger thickness than each electromagnetic steel sheet, thereby minimizing the gaps between the stacked electromagnetic steel sheets.

A motor rotor structure for an electric turbo charger is characterized by including:

a compressor impeller placed in a housing and configured to compress intake air from an air cleaner;

a rotor core rotated by a magnetic field formed by a stator placed in the housing;

a shaft configured to rotate the compressor impeller and the rotor core together; and a bearing mounted on a bearing support portion formed in the housing and configured to support the shaft rotatably, wherein the motor rotor includes: the rotor core which has electromagnetic steel sheets stacked in a thrust direction of the shaft and pre-formed as an integrated member; a stopper portion which is formed on the shaft to restrict movement of the rotor core fitted over the shaft in the thrust direction; and a pressing unit which presses the rotor core against the stopper portion, the pressing unit preventing by a pressing force thereof a circumferential phase shift between the shaft and the rotor core.

This construction provides the structure which prevents a relative circumference slip between the rotor core and the shaft by fitting the rotor core over the shaft and pressing the rotor core toward the stopper portion side by the pressing force of the pressing unit, thus facilitating the mounting of the rotor core on the shaft and making a cost reduction possible based on a reduction in man-hour.

In the present invention, preferably, the motor rotor has, at one end surface of the rotor core, a sensor target plate for detecting a revolution speed which is thicker than a single one of the electromagnetic steel sheets forming the rotor core; and the pressing unit presses the rotor core via the sensor target plate. When the detection of the revolution speed of the rotor core is not necessary, a protective plate may be used instead of the sensor target plate.

This feature provides a positioning mechanism which makes the relative position between the sensor target plate and the rotor core invariable. For this reason, use of the positioning mechanism makes it possible to not only inhibit the rotor core from rotating relative to the shaft but also minimize the interlayer gaps between the stacked electromagnetic steel sheets by pressing the rotor core in the thrust direction of the shaft via the sensor target plate. Further, since the electromagnetic steel sheets can be prevented from exfoliating and deforming, it is possible to keep the interlayer gaps stably, maintain the excellent motor performance, improve the turbo charger performance and, as a result, improve the engine performance.

In the present invention, preferably, the sensor target plate for detecting the revolution speed of the motor rotor is thicker than every one of the electromagnetic steel sheets forming the rotor core and has an inner peripheral wall surface which is in contact with the shaft only in a part of a range extending in the thrust direction when the sensor target plate is in a state of being penetrated by an end portion of the shaft; and a thread portion is formed on a contact-free end side of the shaft for thread engagement with a nut which clamps the sensor target plate.

With this feature, apart of the thickness of the shaft insert hole of the sensor target plate comes into contact with the outer periphery of the shaft and, hence, the sensor target plate can be mounted on the shaft concentrically therewith. In one example shown in FIG. 1(B), the root of a thread cut on the shaft is situated at an intermediate point on the shaft insert hole of the sensor target plate and, hence, the thread portion fails to contact the wall surface of the shaft insert hole of the sensor target plate with a certain clearance therefrom. Therefore, when the sensor target plate is clamped by thread, a sufficient clamping force can be obtained.

Therefore, the sensor target plate can be mounted on the shaft as held concentric therewith. The clamping by the nut (pressing unit) acts to press the entire thrust-direction end face of the rotor core uniformly toward the stopper via the intervening sensor target plate, thereby minimizing the interlayer gaps of the rotor core. Thus, it is possible to realize assembly which ensures motor performance with excellent stability, as well as to improve the precision of detection of the revolution speed of the rotor core.

In the present invention, preferably, the motor rotor has a pair of bearings, one of which is a first bearing disposed on an outer sleeve fitted over the shaft between the rotor core and the compressor impeller, the other of which is a second bearing disposed on an opposite side of the rotor core; and the rotor core is pressed by a nut as the pressing unit against the stopper portion via a seal ring sealing a shaft portion and the outer sleeve from a compressor impeller side.

This feature provides the structure in which the nut presses the rotor core against the stopper portion from the compressor impeller side via the compressor impeller, the seal ring and the outer sleeve. Since this structure allows the rotor core, sleeve, seal ring and compressor impeller to be easily mounted in the order described, it is possible to improve the assemblability, reduce the cost and stabilize the motor rotor quality.

In the present invention, preferably, the motor rotor brings one side of the rotor core into contact with the stopper portion while fixing an opposite side of the rotor core to the shaft by crimping of an end portion of the shaft.

With this feature, the thread portion and the nut are not necessary at the end portion of the shaft in fixing the rotor core to the shaft and, hence, a cost reduction becomes possible.

In the present invention, preferably, the rotor motor has a first engagement portion provided on the rotor core at a portion where the rotor core is fitted with the shaft and a second engagement portion provided on the shaft to engage with the first engagement portion, thereby restricting a relative circumferential shift between the shaft and the rotor core.

This feature provides the engagement structure which restricts a relative circumferential shift between the rotor core and the shaft by engagement between the first engagement portion and the second engagement portion. This structure ensures proper circumferential positional relation between the rotor core and the shaft, facilitates the mounting of the rotor core on the shaft, and makes a cost reduction possible. Further, since there is no need to clamp the rotor core tightly with the nut, the rotor core can be prevented from deforming, which stabilizes the quality of the motor rotor.

In the present invention, preferably, the shaft has, at an intermediate portion thereof, a grip portion which allows the shaft to be gripped when a nut as the pressing unit is tightened and loosened.

This feature having the grip portion provided on the shaft facilitates a nut engaging operation for clamping and loosening the rotor core and allows a nut tightening torque control to be performed easily, thereby stabilizing the quality of the motor rotor.

In the present invention, preferably, the pressing unit includes an elastic member which applies a preload axially of the shaft to fix the rotor core.

With this feature, the fixing is achieved with the preload applied by the elastic member, e.g., a spring. For this reason, even when thermal deformation (linear expansion) of the shaft occurs due to heat, the inner sleeve can be fixed on the shaft stably, thereby inhibiting shaft vibration and rotation of the rotor relative to the shaft. Thus, improved reliability and improved performance can be made compatible with each other.

In the present invention, preferably, the rotor core has an inner sleeve fitted over the shaft and the plurality of electromagnetic steel sheets which are fitted over the inner sleeve and stacked on one another in a thrust direction of the inner sleeve; the inner sleeve and the electromagnetic steel sheets are integrally fixed together; and the pressing unit presses the inner sleeve.

This feature provides the rotor core having the structure in which the inner sleeve and the electromagnetic steel sheets are integrated together. This structure prevents deformation of the electromagnetic steel sheets and the like from occurring in mounting the rotor core on the shaft and facilitates the mounting, thus stabilizing the quality of the turbine rotor.

Since it is possible to mount the rotor core in which the inner sleeve and the electromagnetic steel sheets are integrated together and the shaft+compressor impeller after balance adjustment has been made to each of these components, the final balance adjustment to the turbine rotor becomes easy, which is effective in shortening the time required for balance adjustment (improving the manufacturing process) and reducing the frequency of occurrences of failure in fitting the rotor core over the shaft, thus reducing the man-hour for assembly.

Further, the structure causes the pressing unit to press the inner sleeve in the thrust direction. Therefore, even when thermal deformation (linear expansion) of the shaft occurs due to heat, the pressing force exerted on the electromagnetic steel sheets of the rotor core cannot be affected by such deformation and hence is held at a proper value. Thus, the rotor core and the shaft can be prevented from slipping in the direction of rotation, which stabilizes the quality of the turbine rotor.

In the present invention, preferably, the inner sleeve has an inner diameter which is smaller than an outer diameter of the stopper portion.

With this feature, the inner diameter of the inner sleeve is smaller than the outer diameter of the step portion. For this reason, the pressing force of the pressing unit presses the inner sleeve against the step portion reliably, thereby preventing the inner sleeve and the shaft from slipping in direction of rotation.

In the present invention, preferably, the bearing is a ball bearing; the rotor core has a side surface which is opposed to the ball bearing and which is formed with a flange portion extending radially from an open end peripheral edge of the inner sleeve; and an elastic member is interposed between the flange portion and the ball bearing.

With this feature using the ball bearing as the bearing, a preload is necessary on the ball bearing. However, by interposing the elastic member between the rotor core and the ball bearing, the single elastic member serves both as the preload on the ball bearing and the load pressing the rotor core in the thrust direction, thereby producing a cost reduction effect.

A method of assembling a motor rotor for a turbo charger incorporating an electrically-driven generator therein, is characterized by including the steps of: pre-forming a rotor core by integrating stacked electromagnetic steel sheets together and fixedly fitting the electromagnetic steel sheets thus integrated over an inner sleeve; fitting the rotor core thus pre-formed over a motor rotor shaft; and then fixing the rotor core to the motor rotor shaft by a pressing unit applying a pressing force to the inner sleeve.

With this arrangement, the rotor core is formed as a unit in which the inner sleeve and the stacked electromagnetic steel sheets are integrated together by a separate process. For this reason, when the rotor core is fixed onto the shaft (by press-fitting or shrink-fitting), it is possible to facilitate the mounting of the rotor core on the shaft and prevent the electromagnetic steel sheets from deforming. As the assembly of the motor rotor becomes easy, assembly failures are reduced, which makes it easy to ensure reliable quality.

Further, the time required for the final balance adjustment can be shortened.

The structure according to the present invention includes: the rotor core comprising the electromagnetic steel sheets previously integrated together in a stacked fashion; the stopper portion which is formed on the shaft to restrict movement of the rotor core fitted over the shaft in the thrust direction; and the pressing unit which presses the rotor core fitted over the shaft against the stopper portion, the pressing unit preventing a relative circumferential slip between the rotor core and the shaft by a pressing force thereof. This structure makes it possible to stabilize the quality of the motor rotor, facilitate the mounting of the rotor core on the shaft and reduce the cost by a reduction in man-hour.

Further, by pressing the rotor core toward the stopper portion side via the sensor target plate or the protective plate, it is possible to minimize the interlayer gaps between the stacked electromagnetic steel sheets and prevent the electromagnetic steel sheets from exfoliating and deforming. For this reason, it is possible to retain the interlayer gaps stably and hence maintain the excellent motor performance.

BRIEF DESCRIPTION OF THE DRAWINGS

FIG. 2(A) is a detailed view illustrating the structure of a rotor core mounting portion of a shaft of the rotor motor according to the first embodiment of the present invention; and FIG. 2(B) is a sectional view, taken on line E-E indicated by arrows, of FIG. 2(A);

BEST MODE FOR CARRYING OUT THE INVENTION

Figure 1A:
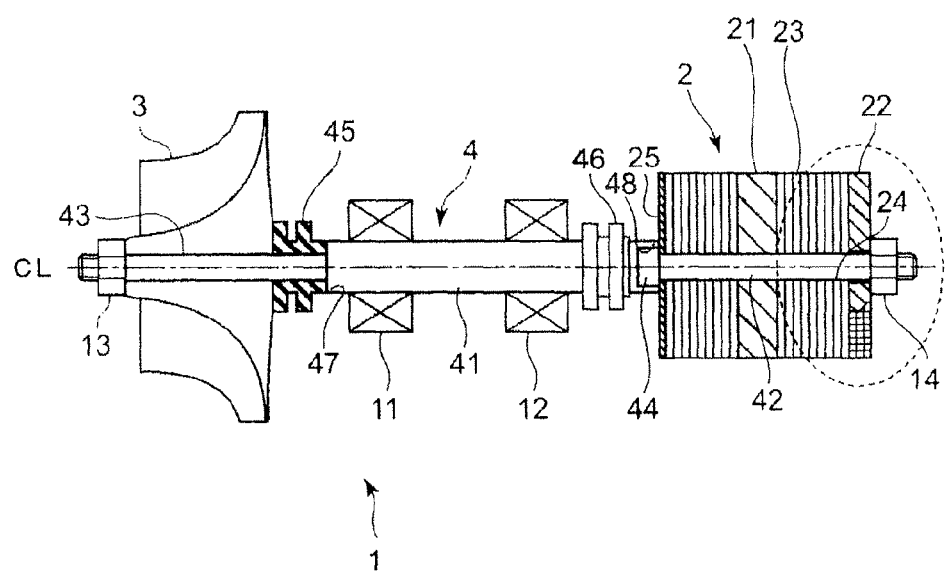
FIG. 1(A) is a schematic view illustrating the structure of a motor rotor according to a first embodiment of the present invention.

Hereinafter, the present invention will be described in detail with reference to practical examples shown in the drawings.

The sizes, materials, shapes, relative positions and the like of the components described in the practical examples are only illustrative and are not intended to limit the scope of the present invention to those described unless particularly pointed out.

First Embodiment

A motor rotor 1 according the first embodiment of the present invention will be described with reference to FIG. 1(A).

The motor rotor 1 includes a shaft 4, a rotor core 2 mounted on one end side of the shaft 4, a compressor impeller 3 mounted on the opposite end side of the shaft 4, and a first bearing 11 and a second bearing 12 which are disposed between the rotor core 2 and the compressor impeller 3 and spaced apart from each other, the first bearing 11 being located on the compressor impeller 3 side, the second bearing 12 being located on the rotor core 2 side. The motor rotor 1 is mounted on a bearing support portion (not shown) placed in a housing of an electric turbo charger via the intervening bearings 11 and 12.

There are a case where the first and second bearings 11 and 12 are disposed between the rotor core 2 and the compressor impeller 3 as described above and a case where the first and second bearings 11 and 12 are disposed on opposite outer sides of the rotor core 2. The present invention is applicable to the both cases.

In the present embodiment, the type of the bearings may be a ball bearing (angular contact ball bearing) or a metal bearing (plain bearing) without particular limitation.

The shaft 4 is a solid shaft comprising a thick shaft portion 41 as an intermediate portion along an axis CL, and thin shaft portions 42 and 43 extending from opposite sides of the thick shaft portion 41, the thin shaft portion 43 being fitted thereover with the compressor impeller 3, the thin shaft portion 42 being fitted thereover with the rotor core 2.

As shown in FIG. 2 which is a partially enlarged view of the thin shaft portion 42 side, a junction portion between the thick shaft portion 41 and the thin shaft portion 42 (which is similar in form to a junction portion between the thick shaft portion 41 and the thin shaft portion 42) forms a step portion 48 (47) perpendicular to the axis CL which serves as a stopper portion against axial movement in mounting the compressor impeller 3 and the rotor core 2.

The step portion 48 between the thick shaft portion 41 and the thin shaft portion 42 has an end portion which is formed at the thick shaft portion 41 side thereof with a flat portion 44 having a width across flat as a grip portion which can be engaged by a spanner.

The width across flat portion 44 serves as a portion to be engaged by a spanner for preventing rotation of the shaft 4 caused by tightening nuts 13 and 14 in mounting the rotor core 2 or the compressor impeller 3 on the shaft 4.

The remaining circumferential surface which is not machined into the flat portion 44 can be utilized as a balance adjustment processing portion when balance adjustment is made after assembly of the motor rotor 1 (see FIG. 2(B)).

Further, the opposite end portions of the shaft 4 (thin shaft portions 42 and 43) are formed with respective thread portions for mounting the compressor impeller 3 and the rotor core 2.

The rotor core 2 includes: a plurality of thin electromagnetic steel sheets 23 stacked in the thickness direction thereof, each having a circular outer periphery and centrally defining a fitting hole 24 to be fitted on (fitted over) the thin shaft portion 42; and a centering 21 comprising an exciting member (soft iron or the like) with a larger thickness than each electromagnetic steel sheet 23 and interposed in the stack of electromagnetic steel sheets 23 at an intermediate position in the stacking direction to enhance the magnetic force.

The stacked electromagnetic steel sheets 23 and the centering 21 are integrated together by crimping or welding the fitting hole portions 24.

In cases where the centering 21 is not interposed, only the stacked electromagnetic steel sheets 23 are integrated together by crimping or welding.

Reference numerals 45 and 46 designate seal rings. The seal ring 45 which is fitted on the rear side of the compressor impeller 3 is formed into a sleeve shape to be fitted on (fitted over) the thin shaft portion 43 and is a member for sealing against a fluid lubricating and cooling the bearings on the bearing support portion placed in the housing of the electric turbo charger.

The seal ring 46 is formed integrally with the thick shaft portion and has the same effect as described above and, therefore, the description thereof is omitted.

The order in which the motor rotor 1 is assembled is as follows. The first and second bearings 11 and 12 are mounted on the thick shaft portion 41 as the intermediate portion of the shaft 4 at respective positions facing the bearing support portion on the housing side.

Subsequently, the seal ring 45 and the compressor impeller 3 are sequentially fitted over the thin shaft portion 43 by inserting the thin shaft portion 43 therethrough until the seal ring 45 abuts against the step portion 47.

Thereafter, the nut 13 is provisionally tightened. The width across flat portion 44 as the grip portion is then engaged by a spanner, while the nut 13 is retightened with another spanner.

Subsequently, a protective plate 25 for protecting the electromagnetic steel sheets 23 is fitted over the thin shaft portion 42, followed by insertion of the thin shaft portion 42 into the rotor core 2. Thereafter, a sensor target plate 22 for revolution control over the motor rotor 1 is combined with one end surface of the electromagnetic steel sheets 23 and then the nut 14 is provisionally tightened. With the width across flat portion 44 (grip portion) being gripped by a spanner, the nut 14 is retightened by another spanner with a predetermined torque to prevent the thin shaft portion 42 and the rotor core 2 from being circumferentially displaced (slipped) relative to each other.

Figure 1B:
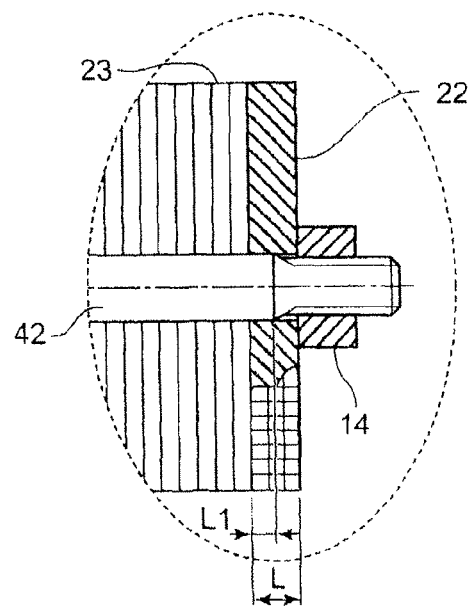
FIG. 1(B) is an enlarged fragmentary view illustrating a portion cut out of the structure.

With reference to FIG. 1(B), description will be made of a state in which the sensor target plate is fitted over the thin shaft portion 42 of the shaft 4.

In the state in which the thin shaft portion 42 of the shaft 4 is inserted through the electromagnetic steel sheets 23 and the sensor target plate 22, the dimensional relationship between the thickness L of the sensor target plate 22 and the length L1 of that portion (part of a range in the thrust direction) of the inner peripheral wall of the sensor target plate 22 which is in contact with the outer periphery of the thin shaft portion 42 of the shaft 4 is L>L1. L1 is set to a length sufficient to obtain concentricity between the sensor target plate 22 and the shaft 4.

When the sensor target plate 22 fitted over the thin shaft portion 42 of the shaft 4 is clamped by the nut 14, the root of the thread portion cut on the thin shaft portion 42 of the shaft 4 (washout thread portion) is formed so to be positioned at an intermediate point (substantially central point) in the thickness direction of the sensor target plate 22. For this reason, even when manufacturing errors occur axially between the rotor core 2 and the thin shaft portion 42, this arrangement necessarily brings the nut 14 into engagement with the thread portion and hence can prevent the clamping force (pressing force) exerted on the rotor core 2 and the sensor target plate 22 from becoming insufficient.

Though the state in which the sensor target plate 22 is fitted according to the present embodiment is illustrated, the sensor target plate may be placed with the protective plate 25 when the revolution control over the motor rotor 1 is not needed. (An embodiment using the protective plate 25 as a substitute for the sensor target plate 22 will be described as a second embodiment.)

In each of the following embodiments, the sensor target plate 22 is provided when the revolution control over the motor rotor 1 is performed, while the protective plate 25 is provided when the revolution control is not performed. For this reason, description thereof will be omitted.

Further, when an elastic member (e.g., belleville spring or the like) having an elastic force in the thrust direction is interposed between the rotor core 2 and the step portion 48 serving as the stopper portion, the thrust force exerted on the rotor core 2 is maintained even when the thin shaft portion 42 is subjected to linear expansion due to heat. For this reason, the rotor core 2 and the thin shaft portion 42 can be prevented from circumferentially slipping relative to each other.

By adopting the arrangement in which the rotor core 2 fitted over the shaft 4 is pressed toward the stopper portion 48 side via the sensor target plate 22 or the protective plate 25 by the pressing force produced by the tightening of the nut 14, the rotor core 2 and the shaft 4 can be prevented from being circumferentially displaced relative to each other. This allows a larger fitting clearance to be provided between the rotor core 2 and the thin shaft portion 42, thus facilitating the mounting of the rotor core 2 on the shaft 4 and making it possible to reduce the cost by reduction in man-hour and improve the quality of the motor rotor 1.

By preventing the axes of the sensor target plate 22 and the shaft 4 from shifting from each other when the sensor target plate 22 is fitted on the thin shaft portion 42 of the shaft 4, it is possible to suppress deterioration of the dynamic balance after assembly of the motor rotor, as well as to improve the precision of detection of the revolution speed of the rotor core 2 thereby to realize high precision revolution speed (turbocharging) control in accordance with the load on the engine. Thus, the engine performance can be improved.

Since the nut 13 is tightened with the width across flat portion 44 engaged by a spanner, tightening torque control is easy, which lessens variation in the pressing force pressing the rotor core 2 against the step portion 47 and hence stabilizes the quality.

Second Embodiment

Like reference numerals are used to designate like components common to the present embodiment and the first embodiment for the purpose of omitting description thereof.

Figure 3:
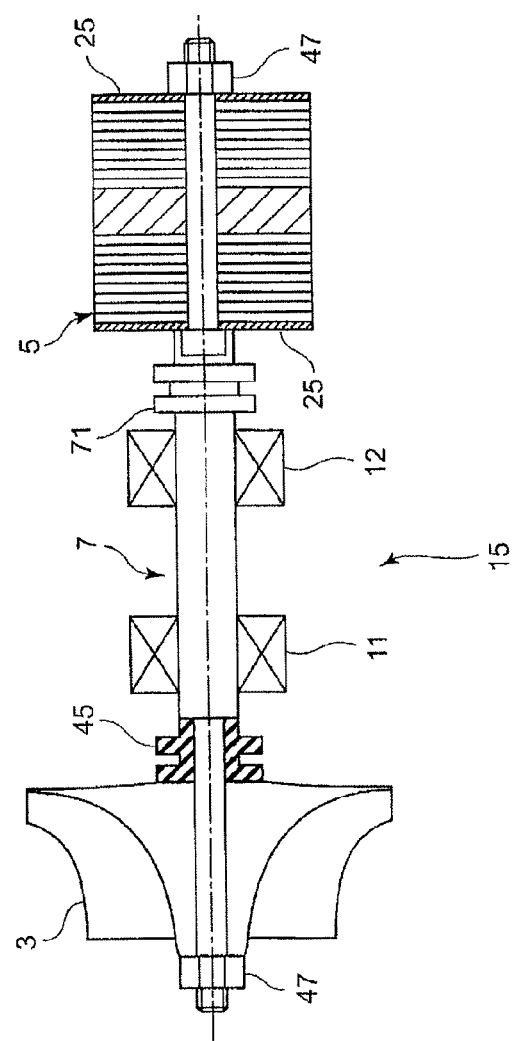
FIG. 3 is a schematic view illustrating the structure of a motor rotor according to a second embodiment of the present invention.

A motor rotor 15 according to the second embodiment of the present invention will be described with reference to FIG. 3.

The motor rotor 15 according to the second embodiment is the same as the motor rotor 1 according to the first embodiment except that the sensor target plate 22 combined with the rotor core 2 of the motor rotor 1 is eliminated and replaced with the protective plate 25 protecting the electromagnetic steel sheets 23. For this reason, description thereof is omitted.

Since the sensor target plate 22 is eliminated, the cost can be reduced.

Third Embodiment

Like reference numerals are used to designate like components common to the present embodiment and the first embodiment for the purpose of omitting description thereof.

Figure 4:
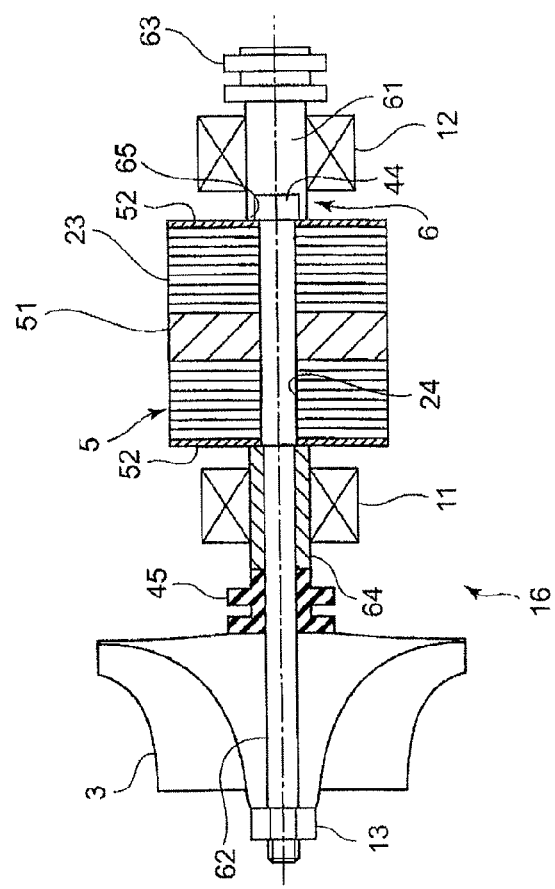
FIG. 4 is a schematic view illustrating the structure of a motor rotor according to a third embodiment of the present invention.

A motor rotor 16 according to the third embodiment of the present invention will be described with reference to FIG. 4.

The motor rotor 16 includes a shaft 6, compressor impeller 3 fixed to one end side of the shaft 6, outer sleeve 64 fitted over the shaft 6 on the rear side of the compressor impeller 3 via seal ring 45, first bearing 11 fitted over the outer sleeve 64, rotor core 5 provided on an intermediate portion of the shaft 6 and pressed by the outer sleeve 64 in the thrust direction against step portion 65 serving as a stopper portion having a step substantially perpendicular to the axis of the shaft 6 in a radial direction, and second bearing 12 disposed adjacent to the rotor core 5.

The opposite end side of the shaft 6 is formed integrally with seal ring 63.

The shaft 6 is a solid rotating shaft which has the step portion 65 at an intermediate portion thereof, thick shaft portion 61 on one end side thereof, and thin shaft portion 62 on the opposite end side thereof. The step portion 65 is a stopper portion for positioning in the thrust direction by stopping the rotor core 5 which is pressed by the outer sleeve 64 in the thrust direction as described above.

The thick shaft portion 61 has an end portion formed at the thin shaft portion 62 side thereof with flat portion 44 having a width across flat as a grip portion which can be engaged by a spanner.

On the thin shaft portion 62 of the shaft 6 are mounted the rotor core 5, outer sleeve 64, seal ring 45 and compressor impeller 3 sequentially. The rotor core 5 is pressed against the step portion 65 from the compressor impeller 3 side by tightening the nut 13.

The rotor core 5 includes: the plurality of thin electromagnetic steel sheets 23 stacked in the thickness direction thereof, each having a circular outer periphery and centrally defining the fitting hole 24 fitted on (fitted over) the thin shaft portion 62; and the centering 21 comprising an exciting member (soft iron or the like) with a larger thickness than each electromagnetic steel sheet 23 and interposed in the stack of electromagnetic steel sheets 23 at an intermediate position in the stacking direction to enhance the magnetic force.

The stacked electromagnetic steel sheets 23 and the centering 21 are formed integrally with each other by crimping the fitting hole portions 24.

The order in which the motor rotor 16 is assembled is as follows. The second bearing 12 is mounted on the thick shaft portion 61 of the shaft 6 at a position facing the bearing support portion on the housing side.

Subsequently, the rotor core 5, outer sleeve 64 over which the first bearing 11 is fitted, seal ring 45 and compressor impeller 3 are sequentially mounted on the thin shaft portion 62 y inserting the thin shaft portion 62 therethrough until the portion is abutted against the step portion 47.

Thereafter, the nut 13 is provisionally tightened. The width across flat portion 44 (grip portion) is then engaged by a spanner, while the nut 13 is retightened with another spanner.

When an elastic member (e.g., belleville spring or the like) having an elastic force in the thrust direction is interposed between the rotor core 5 and the step portion 65, the thrust force exerted on the rotor core 2 is maintained even when the thin shaft portion 42 is subjected to linear expansion due to heat. For this reason, the rotor core 2 and the thin shaft portion 42 can be prevented from circumferentially slipping relative to each other.

The present embodiment provides the structure in which the rotor core 5 is pressed by the nut 13 against the step portion 65 as the stopper portion from the compressor impeller 3 side via the compressor impeller 3, seal ring 45 and outer sleeve 64. For this reason, the rotor core 5, outer sleeve 64, seal ring 45 and compressor impeller 3 can be sequentially mounted with ease, which improves the assemblability, makes a cost reduction possible and stabilizes the quality of the motor rotor 16.

Since the first bearing 11 and the second bearing 12 are disposed on the opposite sides of the heavy rotor core 5, revolution balance of the motor rotor 16 can be adjusted easily.

Fourth Embodiment

Like reference numerals are used to designate like components common to the present embodiment and the first embodiment for the purpose of omitting description thereof.

A motor rotor 17 according to the fourth embodiment of the present invention will be described with reference to FIG. 5.

A shaft 8 of the fourth embodiment is a solid shaft comprising thick shaft portion 81 as an intermediate portion in the thrust direction, and thin shaft portions 82 and 83 extending from opposite sides of the thick shaft portion 81, the thin shaft portion 83 being fitted thereover with the compressor impeller 3, the thin shaft portion 82 being fitted thereover with the rotor core 5.

A junction portion between the thick shaft portion 81 and the thin shaft portion 82 forms a step portion 85 perpendicular to an axis L2 which serves as a stopper portion against axial movement in mounting the rotor core 5.

Further, an end portion of the thin shaft portion 82 of the shaft 8 is configured to clamp the rotor core 5 by being crimped after the rotor core 5 in which stacked electromagnetic steel sheets 23 are integrally fixed to each other has been fitted on the thin shaft portion 82.

Reference numeral 86 designates a protective plate for protecting a side portion of the rotor core 5 against damage which has the same function as the protective plate 25.

The thin shaft portion 83 side on which the compressor impeller 3 is mounted is the same as in the first embodiment and, therefore, description thereof is omitted.

Figure 5:
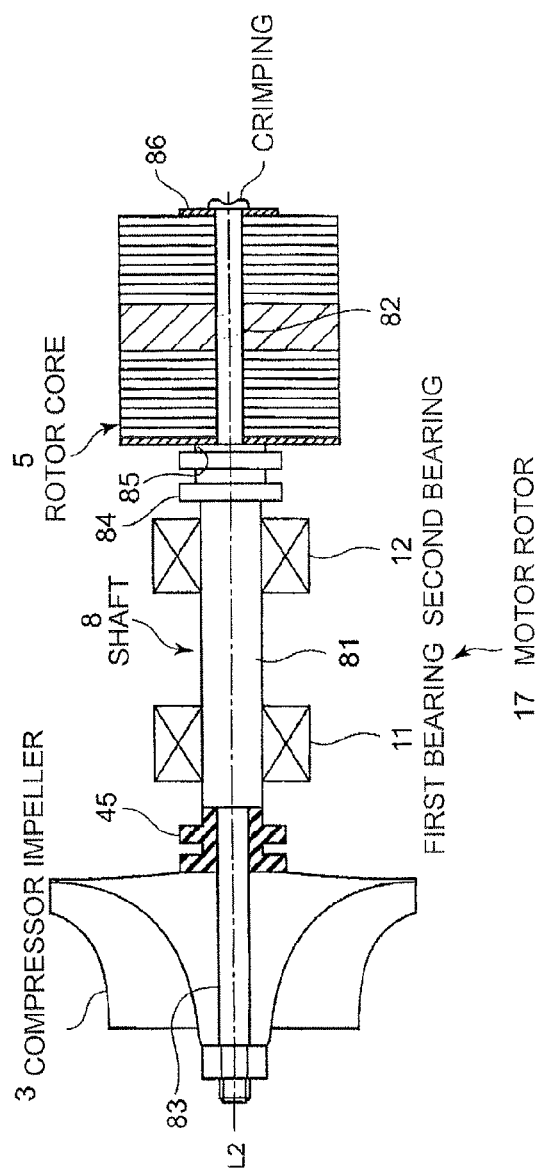
FIG. 5 is a schematic view illustrating the structure of a motor rotor according to a fourth embodiment of the present invention.

Though not shown in FIG. 5, when a pressing unit (e.g., belleville spring or the like) having an elastic force in the thrust direction is interposed between the rotor core 5 and the step portion 85 serving as the stop portion, the thrust force exerted on the rotor core 5 is maintained even when the thin shaft portion 82 is subjected to linear expansion due to heat. For this reason, the rotor core 5 and the thin shaft portion 82 can be more reliably prevented from circumferentially slipping relative to each other.

Since the thread portion and the nut 43 are not needed at an end portion of the shaft 8 for fixing the rotor core 5 to the shaft 8, a cost reduction becomes possible.

Further, unlike the thread engagement structure, the crimped structure does not allow the pressing portion to loosen, which forms a quality improving factor.

Fifth Embodiment

Like reference numerals are used to designate like components common to the present embodiment and the first embodiment for the purpose of omitting description thereof.

Figure 6:
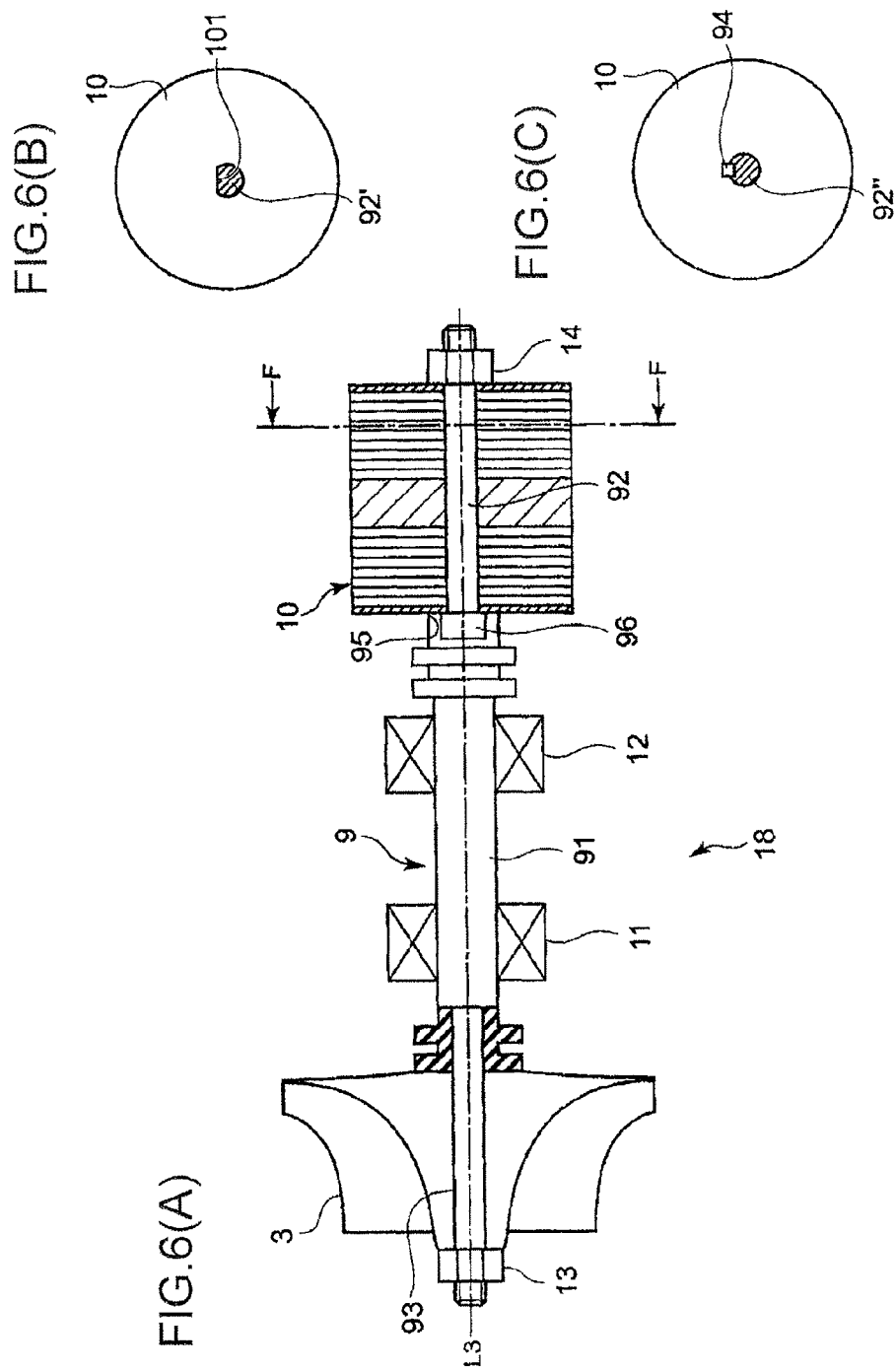
FIG. 6(A) is a schematic view illustrating the structure of a motor rotor according to a fifth embodiment of the present invention.
FIG. 6(B) is a sectional view, taken on line F-F indicated by arrows, of FIG. 6(A) for illustrating the structure of a first engagement.
FIG. 6(C) is a sectional view illustrating the structure of a second engagement.

A motor rotor 18 according to the fifth embodiment of the present invention will be described with reference to FIG. 6.

A shaft 9 of the fifth embodiment is a solid shaft comprising a thick shaft portion 91 as an intermediate portion in the thrust direction, a thin shaft portion 93 extending from one side of the thick shaft portion 91 and fitted thereover with the compressor impeller 3, and a thin shaft portion 92 extending from the opposite side of the thick shaft portion 91 and fitted thereover with a rotor core 10.

A junction portion between the thick shaft portion 91 and the thin shaft portion 92 forms a step portion 95 substantially perpendicular to an axis L3 in a radial direction which serves as a stopper portion against axial movement in mounting the rotor core 10.

The step portion 95 between the thick shaft portion 91 and the thin shaft portion 92 has an end portion formed at the thick shaft portion 91 side thereof with a flat portion 96 having a width across flat as a grip portion which can be engaged by a spanner.

The remaining circumferential surface which is not machined into the width across flat portion 96 can be utilized as a balance adjustment processing portion in balance adjustment to be made after assembly of the motor rotor 1 (see FIG. 2(B)).

As shown in FIG. 6(B) which is a sectional view, taken on line F-F, illustrating the structure of a first engagement between the thin shaft portion 92 and the rotor core 10, a thin shaft portion 92' has a first engagement portion shaped into a semicircular section, while the rotor core 10 has a fitting hole 101 shaped into a semicircular hole as a second engagement portion having the same shape as the section of the thin shaft portion 92'. This structure prevents the thin shaft portion 92' and the rotor core 10 from circumferentially slipping in phase.

In another structure of engagement as shown in FIG. 6(C) illustrating the structure of a second engagement, a thin shaft portion 92" has a section provided with a key 94 as a first engagement portion, while the rotor core 10 has a fitting hole 101 formed with a key groove serving as a second engagement portion to engage the key 94. This structure prevents the thin shaft portion 92" and the rotor core 10 from circumferentially slipping in phase.

Since the thin shaft portion 83 side on which the compressor impeller 3 is mounted is the same as in the first embodiment, description thereof is omitted.

Since the structure thus arranged restricts relative circumferential slip between the rotor core 10 and the shaft 9 by the engagement between the semicircular section of the thin shaft portion 92 and the semicircular fitting hole 101 or the engagement between the key 94 and the key groove, the required precision of fitting between the rotor core and the shaft can be reduced, which facilitates the operation for mounting the rotor core on the shaft and makes a cost reduction possible. Further, since there is no need to clamp the rotor core tightly with a nut, the rotor core can be prevented from deforming and, hence, the quality of the motor rotor can be stabilized.

Sixth Embodiment

Figure 7:
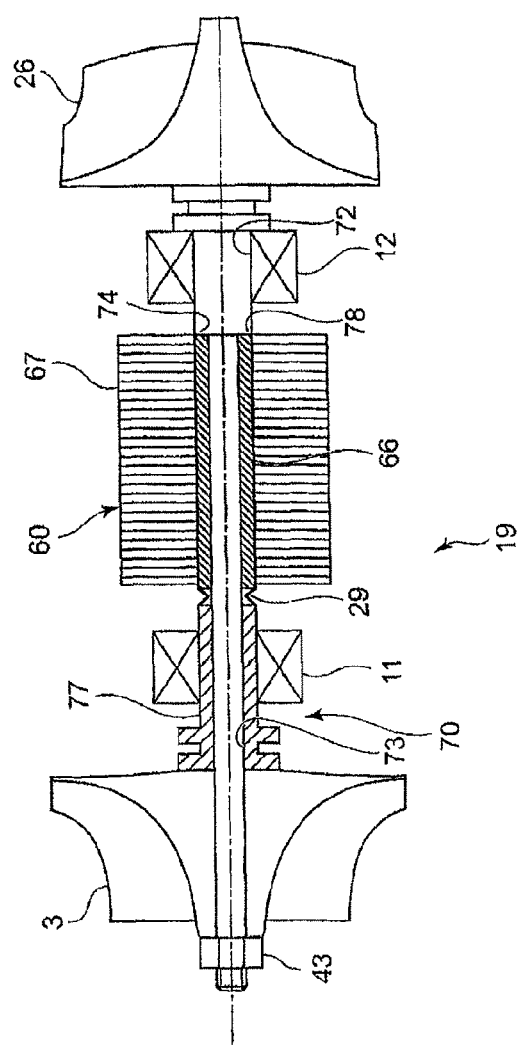
FIG. 7 is a schematic view illustrating the structure of a motor rotor according to a sixth embodiment of the present invention.

A motor rotor 19 according to the sixth embodiment of the present invention will be described with reference to FIG. 7.

The present embodiment is described by exemplifying a turbo charger which is driven by exhaust gas of an engine and which has an electrically-driven generator incorporated therein.

The motor rotor 19 includes a shaft 70, turbine wheel 26 disposed at one end side of the shaft 70, compressor impeller 3 provided at the opposite end side of the shaft 70, first and second bearings 11 and 12 disposed between the turbine wheel 26 and the compressor impeller 3 and spaced apart from each other, the first bearing 11 being located on the compressor impeller 3 side, the second bearing 12 being located on the turbine wheel 26 side, and rotor core 60 as a rotor provided between the two bearings 11 and 12.

There are a case where the first and second bearings 11 and 12 are disposed on opposite outer sides of the rotor core 60 as described above and a case where the two bearings 11 and 12 are disposed between the turbine wheel 26 and the rotor core 60 and spaced apart from each other. The present invention is applicable to the both cases.

In the present embodiment, the type of the bearings 11 and 12 may be a ball bearing or a metal bearing (plain bearing) without particular limitation.

The shaft 70 is a solid rotating shaft having a step portion 74 which becomes much thinner from an intermediate portion of the shaft 70, a thick portion 72 extending on one end side of the shaft 70, and a thin portion 73 extending on the opposite end side of the shaft 70. The step portion 74 serves as a pressing force receiving portion (step portion 74) which receives the pressing force of a belleville spring 29 as an elastic member pressing the rotor core 60 to be described later toward the turbine wheel 26 side.

The thick portion 72 of the shaft 70 has an end portion to which the turbine wheel 26 driven by exhaust gas is fixed securely. On the rear side of the turbine wheel 26 are disposed the bearings 11 and 12 fixed on a bearing support portion (not shown) formed in a turbine housing (not shown).

The step portion 74 serves as a stopper portion, while the thin portion 73 of the shaft 70 is fitted thereover with the rotor core 60 via an intervening inner sleeve 66.

The rotor core 60 comprises a plurality of circular electromagnetic steel sheets 52 fitted over the outer periphery of the inner sleeve 66 and fixedly stacked in the thrust direction of the inner sleeve 66.

The rotor core 60 is a rotor to be rotated by an electric field generated by a stator which is mounted in a non-illustrated turbo charger housing and opposed to the rotor core 60.

The inner sleeve 66 has an inner diameter which is smaller than the outer diameter of the thick portion 72 of the step portion 74 and has an end surface configured to abut against a radially extending contact surface 78 of the step portion 74 reliably.

When at least one of the step portion 74 side end surface of the inner sleeve 66 and the contact surface 78 of the step portion 74 is provided with a rough surface portion for increasing the frictional resistance against the direction of rotation of the shaft, relative movement in the direction of rotation can be prevented more reliably.

On the compressor impeller 3 side of the rotor core 60 are sequentially disposed the belleville spring 29, thrust bush 77, compressor impeller 3 and clamping nut 43 which form a pressing unit. The clamping nut 43 clamps the rotor core 60 tightly.

The clamping force presses the rotor core 60 toward the step portion 74 side via the compressor impeller 3, thrust bush 77 and belleville spring 29.

The first bearing 11 interposed between the rotor core 60 and the compressor impeller 3 is fitted over and fixed to the thrust bush 77.

In the structure thus arranged, the rotor core 5 has an integral structure (inner sleeve structure) in which the inner sleeve 66 and the electromagnetic steel sheets 52 are integrated together. Therefore, the rotor core 5, shaft+turbine wheel 26 and compressor impeller can be assembled together after balance adjustment to each of these components as a single item. Thus, the time required for the final balance adjustment can be shortened (that is, the manufacturing process can be improved).

Further, it is possible to prevent deformation of the electromagnetic steel sheets 52 and the like in mounting the electromagnetic steel sheets 52 on the shaft 70, as well as to facilitate the mounting. Thus, it is possible stabilize the quality of the motor rotor 19 and obtain a cost reduction effect resulting from a reduction in man-hour, a reduction in the amount of waste parts caused by manufacturing failure, and the like.

Further, since the structure is configured to press the inner sleeve in the thrust direction via the belleville spring 29 as the elastic member, the pressing force exerted on the rotor core 5 can be easily maintained at a proper value even when the shaft 4 is subjected to linear expansion due to heat. Thus, it is possible to prevent the electromagnetic steel sheets of the rotor core 5 from deforming and obviate relative slip between the rotor core and the shaft.

Seventh Embodiment

Figure 8:
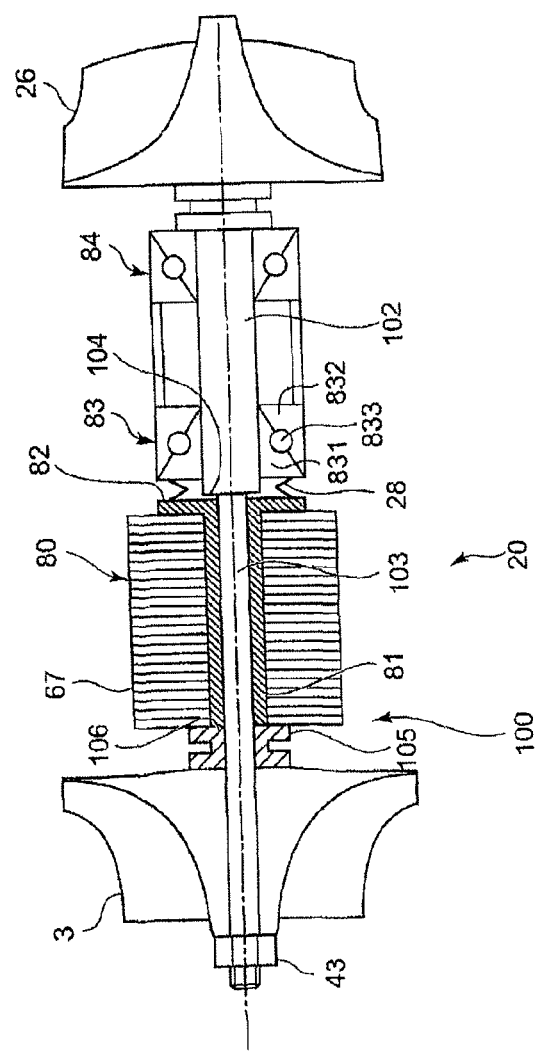
FIG. 8 is a schematic view illustrating the structure of a motor rotor according to a seventh embodiment of the present invention.

A motor rotor 20 according to the seventh embodiment of the present invention will be described with reference to FIG. 8.

The present embodiment is described by exemplifying of a turbo charger which is driven by exhaust gas of an engine and which has an electrically-driven generator incorporated therein.

The motor rotor 20 includes a shaft 100, turbine wheel 26 disposed on one end side of the shaft 100, compressor impeller 3 disposed on the opposite end side of the shaft 100, rotor core 80 mounted on the rear side of the compressor impeller 3 via a seal ring 105, A-bearing 83 of the ball bearing type having the function of positioning in the thrust and radial directions and interposed between the rotor core 80 and the turbine wheel 26 at a position on the rotor core 80 side, B-bearing 84 disposed on the turbine wheel 26 side and spaced apart from the A-bearing 83, and belleville spring 28 interposed between the rotor core 80 and the A-bearing 83 and forming part of a pressing unit.

By clamping with the nut 43, a stopper portion is formed which comprises the belleville spring 28 interposed between a flange portion 82 of an inner sleeve 81 and an inner race 831 of the A-bearing 83, and the seal ring 105 which receives the counterforce of the belleville spring 28.

The shaft 100 is a solid rotating shaft having a step portion 104 which becomes much thinner from an intermediate portion of the shaft 100, a thick portion 102 extending on one end side of the shaft 100, and a thin portion 103 extending on the opposite end side of the shaft 100. The step portion 104 serves as a positioning portion which restricts movement of the rotor core 80 to be described later toward the turbine wheel 26 side.

The thick portion 102 of the shaft 100 has an end portion to which the turbine wheel 26 driven by exhaust gas is fixed securely. On the rear side of the turbine wheel 26 is disposed the B-bearing 84 fixed on a bearing support portion (not shown) formed in a turbine housing (not shown).

The B-bearing 84 is a bearing which restricts movement of the turbine wheel 26 in the radial direction and the direction toward the compressor impeller 3 side.

The rotor core 80 is fitted over the thin portion 103 of the shaft 100 with the step portion 104 used as the positioning portion.

The rotor core 80 comprises a plurality of circular thin electromagnetic steel sheets 67 integrated together as stacked in the thrust direction of the inner sleeve 81 and fixedly fitted over the outer periphery of the inner sleeve 81 (inner sleeve structure).

The inner sleeve 81 has an open end peripheral edge on the A-bearing 83 side which is formed with a flange portion 82 extending radially therefrom to form a seat for the belleville spring 28.

The flange portion 82 is made larger in outer diameter than the belleville spring 28 to prevent the belleville spring 28 from contacting the electromagnetic steel sheets 67 directly.

In mounting the electromagnetic steel sheets 67 on the inner sleeve 81, the flange portion 82 serves as a stopper against movement of the inner sleeve 81 in the thrust direction while facilitating the mounting of the electromagnetic steel sheets 67 into a state of being pressed in the thrust direction. Thus, the mounting quality of the rotor core 80 can be improved.

The rotor core 80 is tightly clamped by the clamping nut 43 from the compressor impeller 3 side via the intervening seal ring 105 provided on the compressor impeller 3 side of the rotor core 80.

The clamping force causes the flange portion 82 of the rotor core 80 to press the belleville spring 11 toward the turbine wheel 26 side via the compressor impeller 3 and the seal ring 105, thus pressing the inner race 831 of the A-bearing 83 toward the turbine wheel 26 side.

The structure thus arranged can cause the belleville spring 28 to apply a preload on the A-bearing 83.

The inner race 831 of the A-bearing 83 is constantly pressed toward the turbine wheel 26 side in such manner as to secure a clearance between the flange portion 82 and the step portion 104.

By making the inner diameter of the inner sleeve 81 smaller than the outer diameter of the seal ring 105, the end surface of the inner sleeve 81 on the compressor impeller 3 side can reliably abut against the contact surface of the seal ring 105.

When at least one of the inner sleeve 81 and the contact surface 106 of the seal ring 105 is provided with a rough surface portion for increasing the frictional resistance against the direction of rotation of the shaft 100, relative movement in the direction of rotation can be prevented more reliably.

In addition to the effect of the sixth embodiment, the structure of the present embodiment exhibits an effect such that the single elastic member (belleville spring 28) is capable of applying a preload on the A-bearing 83 as well as exerting the pressing force which prevents the rotor core 80 and the shaft 100 from slipping in the direction of rotation, thus realizing a cost reduction.

Figure 9:
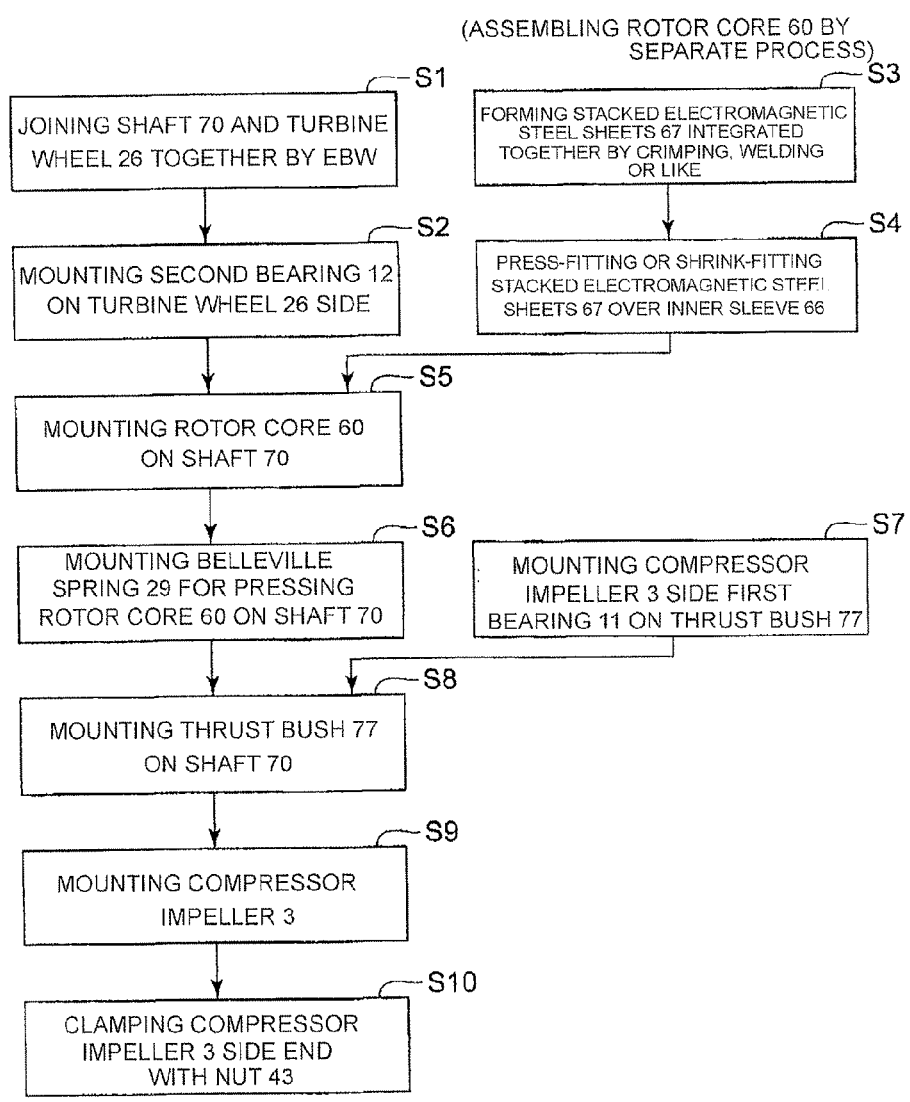
FIG. 9 is a schematic view illustrating the structure of a motor rotor according to an eighth embodiment of the present invention.
Figure 10:
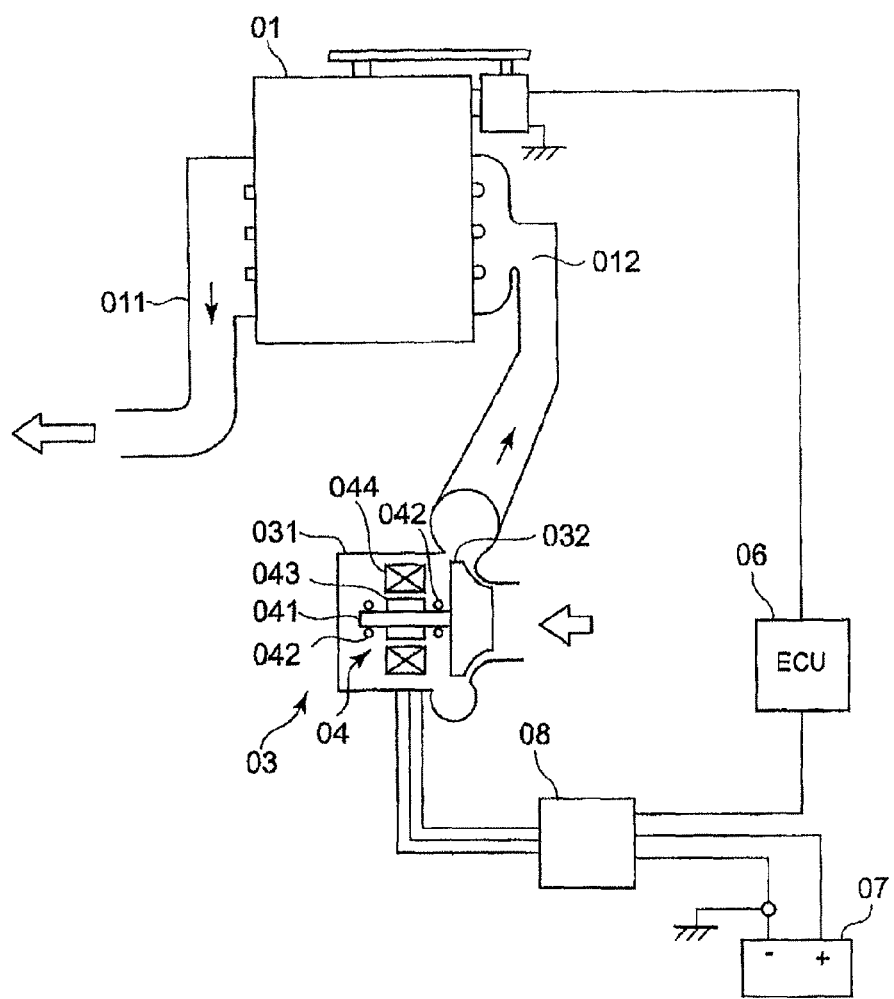
FIG. 10 is a schematic view illustrating the structure of an engine incorporating a supercharger according to a conventional technique.
Figure 11:
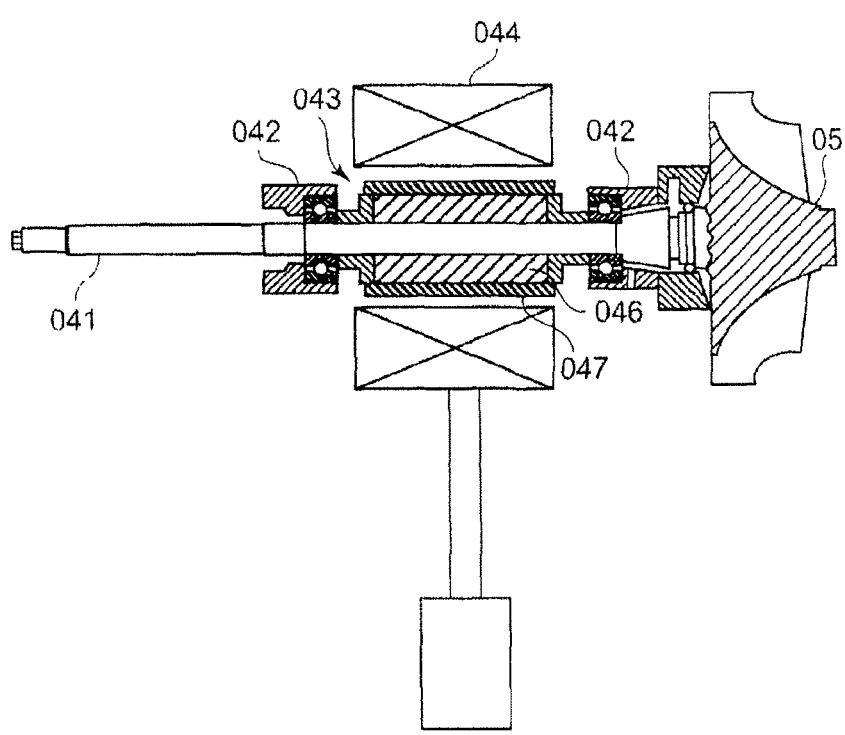
FIG. 11 is a schematic view illustrating a motor rotor according to a conventional technique.

A method of assembling the motor rotor 19 will be described based on the foregoing sixth embodiment with reference to FIG. 9.

The motor rotor 1 is assembled by a process including: step S1 of joining the shaft 70 and the turbine wheel 26 together by EBW (Electronic Beam Welding); step S2 of mounting the turbine wheel 26 side second bearing 12 on the shaft 90; step S3 of forming the rotor core 60 by a separate process including stacking a plurality of metallic plate-shaped electromagnetic steel sheets 67 formed by a press or the like on one another and integrating the stacked electromagnetic steel sheets 67 together by crimping, welding or the like; step S4 of press-fitting (or shrink-fitting) the stacked electromagnetic steel sheets 67 over the inner sleeve 66 to assemble the rotor core 60; step S5 of mounting the rotor core 60 on the shaft 70 which has been fitted with the second bearing 12 on the turbine wheel 26 side by step S2; step 6 of mounting the belleville spring 29 for pressing the rotor core 60 on the shaft 4; step S7 of mounting the compressor impeller 3 side first bearing 11 on the thrust bush 77; step S8 of mounting the thrust bush 77 on the shaft 70; step S9 of mounting the compressor impeller 3 on the shaft 70; and step S10 of clamping an end of the compressor impeller 3 with the nut 43.

Since the method includes assembling the rotor core 60 by integrating the inner sleeve 66 and the stacked electromagnetic steel sheets 67 into a cassette-like structure (inner sleeve structure) by the separate process and then fixing the rotor core 60 thus integrated onto the shaft 70 (by press fitting or shrink fitting), it is possible to assemble the rotor core 60, shaft 70+turbine wheel 26 and compressor impeller together after balance adjustment to each of these components as a single item. Thus, the time required for the final balance adjustment can be shortened (that is, the manufacturing process can be improved).

Further, it is possible to prevent deformation of the electromagnetic steel sheets 67 as well as to facilitate the mounting on the shaft 70. Thus, it is possible stabilize the assembly quality of the motor rotor 19 and obtain a cost reduction effect resulting from a reduction in man-hour, a reduction in the amount of waste parts caused by manufacturing failure, and the like.

INDUSTRIAL APPLICABILITY

The motor rotor structure is used in the internal combustion engine to improve the output performance thereof. In the structure, an electric motor is incorporated in the rotating shaft of an electric turbo charger which compresses and turbocharges intake air and a compressor impeller is rotatably driven, thereby enhancing the output power of an internal combustion engine.

The invention claimed is:

1. A motor rotor structure for an electric turbo charger, comprising:
a compressor impeller placed in a housing and configured to compress intake air from an air cleaner;
a rotor core rotated by a magnetic field formed by a stator placed in the housing;
a shaft configured to rotate the compressor impeller and the rotor core together; and
a bearing mounted on a bearing support portion formed in the housing and configured to support the shaft rotatably, wherein
the motor rotor includes: the rotor core which comprises electromagnetic steel sheets stacked in a thrust direction of the shaft and pre-formed as an integrated member; a stopper portion which is formed on the shaft to restrict movement of the rotor core fitted over the shaft in the thrust direction; and a pressing unit which presses the rotor core against the stopper portion,
the pressing unit preventing by a pressing force thereof a circumferential phase shift between the shaft and the rotor core,
wherein
the rotor core has, at one end surface of the stacked electromagnetic steel sheets, a sensor target plate for detecting a revolution speed of the motor rotor; and
the pressing unit pressing the rotor core against the stopper portion presses the rotor core in the thrust direction of the shaft via the sensor target plate, and
wherein
the sensor target plate for detecting the revolution speed of the motor rotor is thicker than every one of the electromagnetic steel sheets forming the rotor core and has an inner peripheral wall surface extending along the thrust direction of the shaft only in a part of which is in contact with the shaft in a radial direction of the shaft when the sensor target plate is in a state of being penetrated by an end portion of the shaft, a length along the thrust direction of the shaft of the inner peripheral wall surface being longer than a length along the thrust direction of the shaft of the part that is in contact with the shaft; and
a thread portion is formed on a contact-free end side of the shaft for thread engagement with a nut which clamps the sensor target plate.

2. The motor rotor structure for an electric turbo charger according to claim 1,
wherein the rotor motor has a first engagement portion provided on the rotor core at a portion where the rotor core is fitted with the shaft and a second engagement portion provided on the shaft to engage with the first engagement portion, thereby restricting a relative circumferential shift between the shaft and the rotor core.

3. The motor rotor structure for an electric turbo charger according to claim 2, wherein the shaft has, at an intermediate portion thereof, a grip portion which allows the shaft to be gripped when a nut serving as the pressing unit is tightened and loosened.

4. The motor rotor structure for an electric turbo charger according to claim 1, wherein the shaft has, at an intermediate portion thereof, a grip portion which allows the shaft to be gripped when a nut serving as the pressing unit is tightened and loosened.

5. A motor rotor structure for an electric turbo charger, comprising:
a compressor impeller placed in a housing and configured to compress intake air from an air cleaner;
a rotor core rotated by a magnetic field formed by a stator placed in the housing;
a shaft configured to rotate the compressor impeller and the rotor core together; and
a bearing mounted on a bearing support portion formed in the housing and configured to support the shaft rotatably,
wherein
the motor rotor includes: the rotor core which comprises electromagnetic steel sheets stacked in a thrust direction of the shaft and pre-formed as an integrated member; a stopper portion which is formed on the shaft to restrict movement of the rotor core fitted over the shaft in the thrust direction; and a pressing unit which presses the rotor core against the stopper portion,
the pressing unit preventing by a pressing force thereof a circumferential phase shift between the shaft and the rotor core, and
wherein
the motor rotor has a pair of bearings, one of which is a first bearing radially disposed on an outer sleeve fitted over the shaft between the rotor core and the compressor impeller, and the other of which is a second bearing disposed on an opposite side of the rotor core; and
the rotor core is pressed by a nut as the pressing unit against the stopper portion via a seal ring sealing a shaft portion and the outer sleeve from a compressor impeller side.

6. The motor rotor structure for an electric turbo charger according to claim 5, wherein the shaft has, at an intermediate portion thereof, a grip portion which allows the shaft to be gripped when a nut serving as the pressing unit is tightened and loosened.

7. A motor rotor structure for an electric turbo charger, comprising:
a compressor impeller placed in a housing and configured to compress intake air from an air cleaner;
a rotor core rotated by a magnetic field formed by a stator placed in the housing:
a shaft configured to rotate the compressor impeller and the rotor core together; and
a bearing mounted on a bearing support portion formed in the housing and configured to support the shaft rotatably,
wherein
the motor rotor includes: the rotor core which comprises electromagnetic steel sheets stacked in a thrust direction of the shaft and pre-formed as an integrated member; a stopper portion which is formed on the shaft to restrict movement of the rotor core fitted over the shaft in the thrust direction; and a pressing unit which presses the rotor core against the stopper portion, the pressing unit preventing by a pressing force thereof a circumferential phase shift between the shaft and the rotor core,
wherein
the rotor core has an inner sleeve fitted over the shaft and the plurality of electromagnetic steel sheets which are fitted over the inner sleeve and stacked on one another in a thrust direction of the inner sleeve, and
the inner sleeve and the electromagnetic steel sheets are integrally fixed together; and
the pressing unit presses the inner sleeve, and
wherein
the bearing includes a first ball bearing and a second ball bearing spaced apart from the first ball bearing, the first ball bearing disposed closer to the compressor impeller that the second ball bearing,
the rotor core is disposed closer to the compressor impeller than the first ball bearing the second ball bearing and has a side surface which is opposed to the first ball bearing and which is formed with a flange portion extending radially from an open end peripheral edge of the inner sleeve, and
the pressing unit comprises an elastic member interposed between the flange portion and the first ball bearing.

8. The motor rotor structure for an electric turbo charger according to claim 7, wherein the inner sleeve has an inner diameter which is smaller than an outer diameter of the stopper portion.

9. A motor rotor structure for an electric turbo charger, comprising:
a compressor impeller placed in a housing and configured to compress intake air from an air cleaner;
a rotor core rotated by a magnetic field formed by a stator placed in the housing;
a shaft configured to rotate the compressor impeller and the rotor core together; and
a bearing mounted on a bearing support portion formed in the housing and configured to support the shaft rotatably, wherein
the motor rotor includes: the rotor core which comprises electromagnetic steel sheets stacked in a thrust direction of the shaft and pre-formed as an integrated member; a stopper portion which is formed on the shaft to restrict movement of the rotor core fitted over the shaft in the thrust direction; and a pressing unit which presses the rotor core against the stopper portion,
the pressing unit preventing by a pressing force thereof a circumferential phase shift between the shaft and the rotor core,
wherein
the rotor core has, at one end surface of the stacked electromagnetic steel sheets, a sensor target plate for detecting a revolution speed of the motor rotor; and
the pressing unit pressing the rotor core against the stopper portion presses the rotor core in the thrust direction of the shaft via the sensor target plate, and
wherein
the sensor target plate for detecting the revolution speed of the motor rotor is thicker than every one of the electromagnetic steel sheets forming the rotor core and has an inner peripheral wall surface only a part of which is in direct contact with the shaft in a radial direction of the shaft when the sensor target plate is in a state of being penetrated by an end portion of the shaft; and
a thread portion is formed on a contact-free end side of the shaft for thread engagement with a nut which clamps the sensor target plate.

10. The motor rotor structure for an electric turbo charger according to claim 9, wherein the shaft has, at an intermediate portion thereof, a grip portion which allows the shaft to be gripped when a nut serving as the pressing unit is tightened and loosened.

* * * * *